March 18, 1958 M. TRACHTMAN ET AL 2,827,380
APPARATUS FOR AND METHOD OF CURING HAMS
Filed Oct. 3, 1955 2 Sheets-Sheet 1

INVENTORS.
MORRIS TRACHTMAN
BY ARNOLD S. ZITIN

ATTORNEY.

March 18, 1958   M. TRACHTMAN ET AL   2,827,380
APPARATUS FOR AND METHOD OF CURING HAMS
Filed Oct. 3, 1955   2 Sheets-Sheet 2
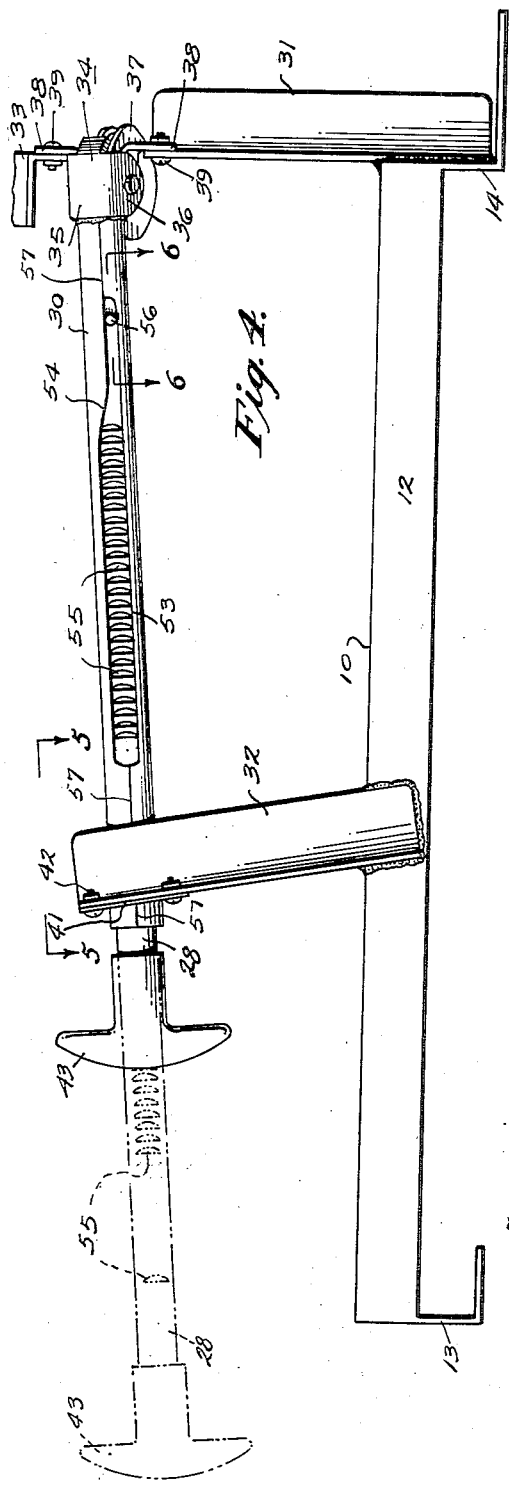
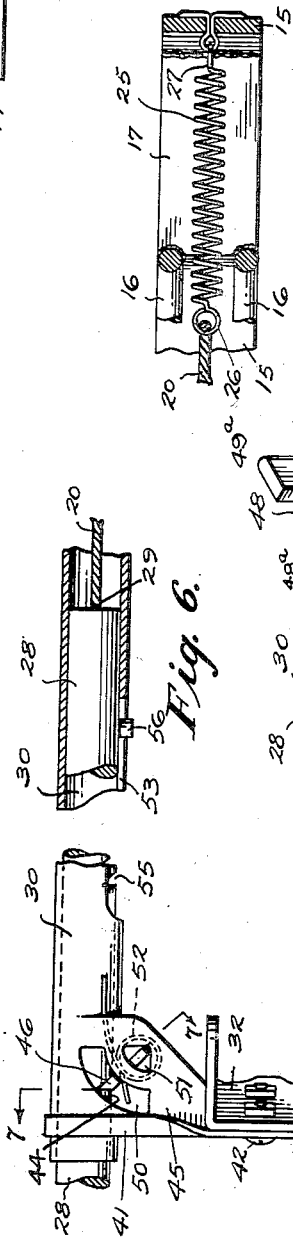
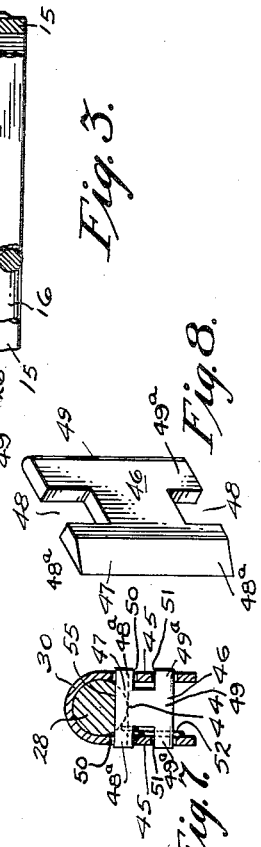
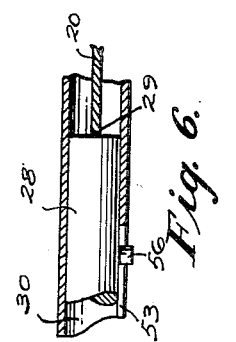
INVENTORS.
MORRIS TRACHTMAN
BY ARNOLD S. ZITIN
ATTORNEY.

United States Patent Office 2,827,380
Patented Mar. 18, 1958

2,827,380

APPARATUS FOR AND METHOD OF CURING HAMS

Morris Trachtman, Philadelphia, and Arnold S. Zitin, Wynnewood, Pa., assignors to Morris Trachtman, Philadelphia, Arnold S. Zitin, Wynnewood, and Bernard C. Zitin, Merion, Pa., trustees Application October 3, 1955, Serial No. 538,022

9 Claims. (Cl. 99—159)

The present invention is concerned generally with a method of introducing a preserving medium into the carcass of an animal and apparatus for sealing the carcass against egress of the preserving medium and particularly with a method of injecting brine into a ham or shoulder and apparatus for sealing the ham or shoulder against egress of the brine.

A principal object of the present invention is to provide apparatus for applying a tourniquet to the small end or neck of a ham, shoulder or the like for closing the vascular tract to prevent egress of brine injected into the vascular tract at the large end or butt of the ham.

Another important object of the present invention is to provide such apparatus wherein the neck embracing part of the tourniquet is in the form of a permanent loop that is normally distended for receiving the neck or shank of the ham or shoulder and which can be drawn more or less tightly about the neck or shank with the expenditure of a minimum of time and effort.

And still another important object of the present invention is to provide such apparatus wherein the loop drawing part of the tourniquet automatically locks in a selected position and the loop forming part of the tourniquet automatically resumes its distended condition upon release of the loop drawing part.

Other objects and advantages of the invention will appear more fully hereinafter, it being understood that the present invention consists substantially in the method and the construction of apparatus, all as hereinafter described, shown in the accompanying drawings and finally pointed out in the appended claims.

In the accompanying drawings:

Figure 3 is an enlarged section taken on line 3—3 of Figure 2;

Figure 4 is a side elevation of the apparatus of Figure 1;

Figure 5 is a fragmentary enlarged plane view taken on line 5—5 of Figure 4;

Figure 6 is a fragmentary enlarged horizontal section taken on line 6—6 of Figure 4;

Figure 7 is a section taken as indicated by line 7—7 of Figure 5; and

Figure 8 is a perspective enlarged view of the pawl shown in Figures 5 and 7.

Figure 1:
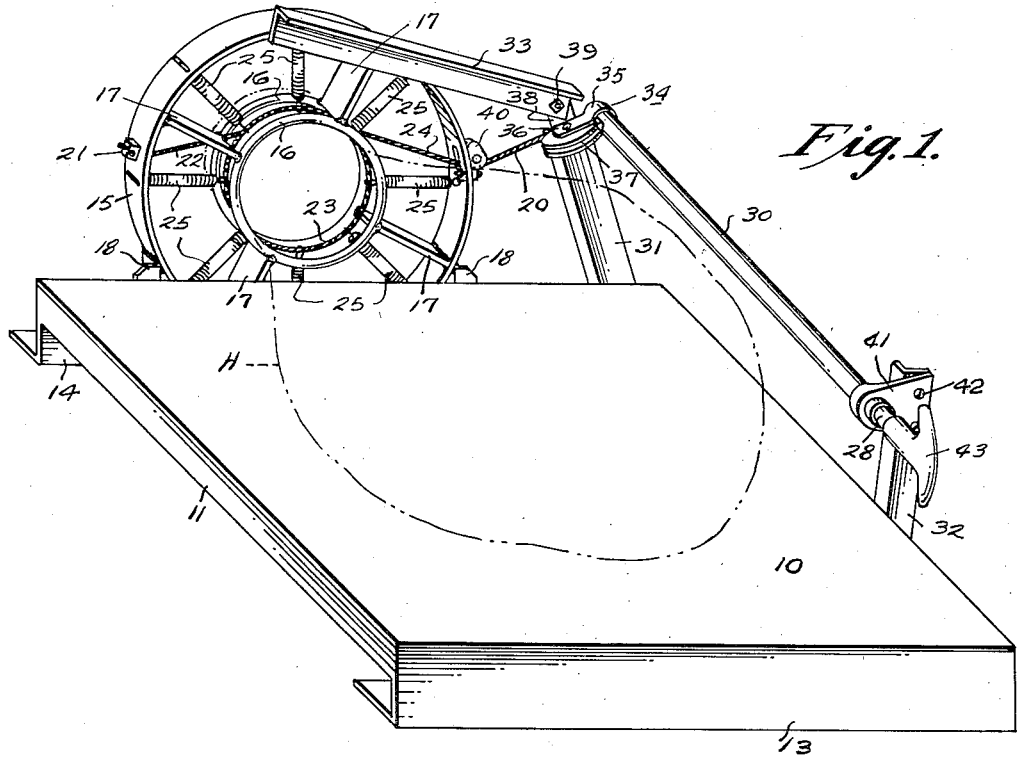
Figure 1 is a perspective view of apparatus constructed in accordance with and embodying the present invention.
Figure 2:
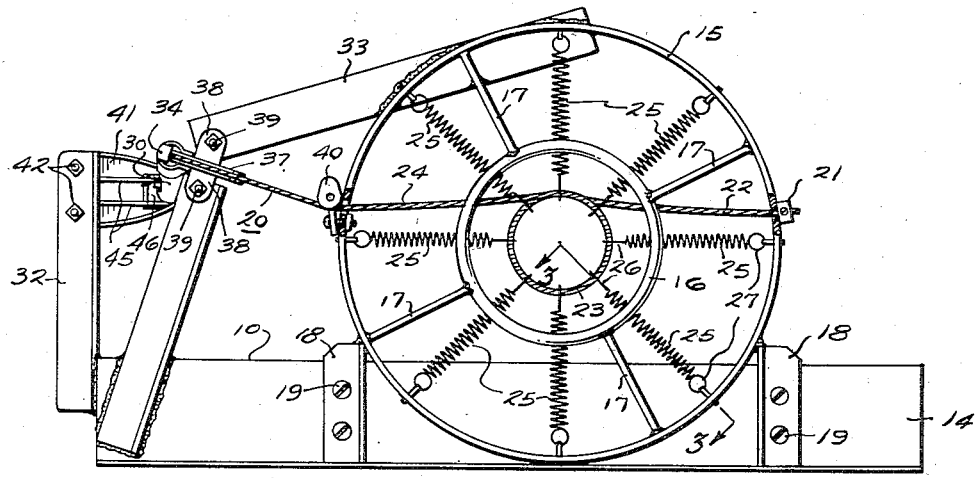
Figure 2 is a rear elevation of the apparatus of Figure 1.

As illustrated, the apparatus constructed in accordance with and embodying the principles of the present invention has a rigid frame structure preferably made of metal. The base section of this structure has a flat horizontally extending rectangular top 10, flanges 11—12 that depend respectively from opposite sides of the top 10, and flanges 13—14 that depend respectively from the front and rear of the top 10.

At the rear of this base section is an open annular frame assembly having an outer annulus 15 formed of flat metal. Within said annulus is a spider having a pair of central ring members 16—16 of equal diameter which are secured in position by a plurality of uniformly spaced, radially extending arms 17. These rings 16—16 which are disposed in axially spaced parallel planes, are positioned concentrically to one another and to the outer annulus or rim 15. The annular frame section stands upright at the rear end of the base section, as shown, and is provided with a pair of laterally spaced depending legs 18—18 of right angle cross-section. The component elements of the annular frame section are rigidly secured together, as by welding, and the entire assembly is rigidly secured to the base section of the frame structure, as by screws 19. When the annular frame section is mounted in the manner aforesaid, the side edge of the bottom portion of the annulus or rim 15 abuts the rear flange 14 of the base section so that the central rings 16—16 are entirely spaced above the level of the top 10 of the base section.

The tourniquet part of the apparatus is formed of a flexible cable 20 one end of which is anchored to the outer rim 15, as by a cable clamp 21, at a level slightly above the level of the central axis of the annular frame section. From this anchorage, the cable extends freely through the spider, inwardly, as at 22, is then looped upon itself, as at 23, centrally within the rings 16—16, and then continues outwardly, as at 24, freely through the rim 15 at approximately the same level as the anchorage. The loop 23 is somewhat smaller in diameter than the rings 16—16 and is approximately centered therewithin.

For supporting the cable 20 arranged in the manner aforesaid, a set of radially extending tension coil springs 25 are circumferentially equally spaced about the annular frame section and project inwardly from the outer rim 15 through the space between the rings 16—16 toward the center thereof. The looped portion 23 of the cable extends freely through the inner looped ends of the several coil springs, as at 26, while the outer ends of the coil springs are anchored to the outer rim 15, as at 27. The rings 16—16 are axially spaced apart a distance sufficient for suitably restricting lateral movement of the portion of the cable looped through the inner ends of the springs 25.

The free end portion of the cable 20 is suitably secured to one end portion of a rigid rod 28, as at 29 (see Figure 6) which rod 28 is slidably fitted into a tubular guide sleeve 30 that extends horizontally fore and aft well above and at one side of the base section of the frame structure, the guide sleeve being supported in fixed position by any suitable means, as by a pair of uprights 31—32 and a brace 33 extending from the rim 15 to the upright 31.

For securing together the tubular sleeve 30, the post 31, and the brace 33, a fitting 34 is provided which fitting has a strap part that tightly embraces the sleeve 30, as at 35, and which terminates in opposite end portions, as at 36—36, between which a pulley 37 is mounted to revolve freely. The opposite end portions 36—36 of the strap are provided respectively with coplanar wings 38—38 that extend laterally therefrom in opposite directions and which are secured respectively to the proximate ends of the post 31 and brace 33, as by the bolts 39. The cable 20 extends under a guide pulley 40 secured to the rim 15 of the annular frame assembly, around the guide pulley 37 and into the open end of the sleeve 30 to its connection 29 with the rod 28.

For securing together the tubular sleeve 30 and the post 32, the former is projected through a bracket 41 that extends laterally therefrom and which is rigidly secured to the post 32, as by screws 42.

The rod 28 is provided with a handle 43 by means of which it may be pulled forwardly in the guide sleeve 30. When this is done, the cable 20 follows, and the loop 23 is closed against the force exerted by the coil springs 25 to keep the loop 23 open. If the rod is now released, the springs 25 contract, whereupon the loop 23 is opened by the coil springs 23, the cable 20 is drawn rearwardly in the guide sleeve 30 and the rod 28 follows the cable 20. In the use of the apparatus, a ham H is placed upon the top 10 of the base section with its neck in the loop 23. The latter is now drawn tightly about the neck of the ham in the manner aforesaid, by a pull forward on the handle 43. Brine solution may now be injected in the vascular tract, at the free or butt end of the ham. After a suitable lapse of time, the rod 28 is released, whereupon the coil springs 25 automatically open the loop 23 for releasing the neck of the ham and removal of the ham from the apparatus. Preferably, even when the loop 23 is fully open, the coil springs 25 are slightly tensioned.

Immediately to the rear of the bracket 41, the guide sleeve 30 is provided with an opening 44 that is formed in one side of the sleeve, and respectively above and below this opening are a pair of tangential extensions of the tubular sleeve wall in the form of a pair of vertically spaced parallel wings 45—45, corresponding side edges of which are secured to the bracket 41, as by welding.

Referring particularly to Figures 7 and 8, the wings 45—45 carry a generally rectangular pawl 46 that has a beveled nose part 47; opposite sides that are recessed, as at 48—48; and a heel part that is rounded, as at 49. This pawl is mounted upright between the wings 45—45 with the upper and lower nose portions 48ª—48ª projecting into a pair of arcuate openings 50—50 respectively formed in the wings 45—45, and with the upper and lower heel portions 49ª—49ª projecting into an additional pair of openings 51—51 respectively formed in the wings 45—45. The pawl 46 is thus mounted for horizontal swinging movement about its heel portion, the nose thereof being guided in the arcuate slots 50—50. A suitable spring 52 is provided for biasing the pawl 46 against the side of the rod 28, and, if desired, the opening 51 and one end of the arcuate opening 50 in one of the wings 45 may be joined by a radially extending slit (not shown) to facilitate easy removal and replacement of the pawl 46. In the absence of such a slit, the pawl 46 may be secured in operative positions between the wings 45—45 simply by bending the same away from one another, inserting the pawl therebetween and then re-bending the wings into parallel relation.

Formed in the guide sleeve 30, in longitudinal alinement with the opening 44, is a longitudinally extending slot 53 extending from a point to the rear of the post 32 to a point just short of the post 31. The opposite end portions of the upper edge of this slot 53 are circumferentially offset and smoothly joined together by an intermediate relatively sloping portion 54, whereby the slot 53 is uniformly rather wide throughout its fore end portion, gradually tapers throughout its intermediate portion to a considerably narrower width and is uniformly of the narrower width aforesaid throughout its aft end portion.

Formed in the side of the rod 28 are a series of longitudinally spaced transversely extending notches 55. One of the notches 55 is widely separated from the others, which latter are closely bunched together. This one or final notch is normally presented opposite the opening 44 in the guide sleeve 30, and the pawl 46 is positioned in a vertically extending plane at an angle of approximately 45 degrees relative to the axis of the rod 28, with the nose 47 of the pawl fully engaged in the final notch, as best shown in Figure 5. It will be apparent that the pawl 46 secures the rod 28 against being shifted rearwardly by the cable 20 under the influence of the springs 25.

When the rod 28 is shifted forwardly by the operator pulling on the handle 43, the pawl 46 swings counter-clockwise (as viewed in Figure 5) against the force of the spring 52, and the nose 47 thereof is dislodged from the final notch 55. As the forward movement of the rod 28 continues, the side of the rod slides over the pawl 46 in contact with the nose 47 and the latter ratchets over the detents between the closely spaced notches 55 until a selected notch 55 is opposite the nose 47 of the pawl, whereupon the rod 28 is released by the operator. The pawl 46 is turned clockwise by the spring 52 so that the nose 47 fully engages the selected notch 55. It will be apparent that the pawl 46 automatically secures the rod 28 in its newly selected position against being shifted rearwardly by the cable 20 under the influence of the springs 25.

Mounted upon the rod 28 for movement therewith is a pin 56 that projects laterally from the rod 28 and freely through the slot 53 in the sleeve 30. Normally, the pin 56 is located in the narrower end of the slot 53, but as the rod 28 is pulled forwardly in the guide sleeve 30, the pin 56 follows, moving forwardly in the slot 53 and finally engaging the end thereof to limit the forward movement of the rod 28. In this condition of the apparatus, the notch 55 nearest the pin 56 is positioned for engagement with the pawl 46. In this connection, the distance from the pin 56 to the notch 55 nearest thereto preferably is at least as great as the distance from the forward end of the slot 53 to the nose 47 of the pawl.

To release the rod 28 from the pawl 46, the former is shifted about its axis an amount sufficient for turning the notches 55 away from the pawl 46, whereupon the rod 28 is automatically shifted rearwardly by the cable 20 under the influence of the springs 25. Throughout this shifting movement the pin 56 moves along the upper edge of the slot 53, in contact therewith. As it moves along the sloping intermediate portion 54 of the upper slot edge, the rod 28 is again shifted about its axis an amount sufficient for turning the notches 55 back to their initial position, facing the pawl 46. It will be apparent that this sloping intermediate portion 54 of the upper slot edge functions as a cam and the pin 56 as a cam follower. It will be observed that the distance from the point at which the pin 56 enters the cam surface 54 to the nose 47 of the pawl is greater than the distance from the pin 56 to the one of the closely bunched notches 45 remote from the pin 56, in consequence of which when the pin 56 enters upon the cam surface 54, the pawl 46 is engaged with the unnotched portion of the rod 28 that separates the final notches 55 from the closely bunched notches 55. When the final notch 55 is presented opposite the nose 47 of the pawl, the latter again lodges therein and secures the rod 28 against movement rearwardly, as described hereinbefore.

It will be observed that the guide sleeve 30, including the wings 38—38, is conveniently formed from a single piece of sheet metal suitably cut to shape and rolled into a tube that is seamed, as shown, along the line 57.

It will be understood, of course, that the present invention as hereinbefore described and shown in the accompanying drawings is susceptible of various changes and modifications which may be made from time to time without departing from the general principles or real spirit of the invention, and accordingly, it is intended to claim the same broadly, as well as specifically, as indicated by the appended claims.

What is claimed as new and useful is:

1. In an apparatus for constricting the shank portion of a ham or other meat product preparatory to injecting the ham with curing liquid, a structure comprising a base member having a horizontally disposed supporting surface for the ham and an upstanding rigid frame member affixed to the rear of said base member, said frame member having a central opening which is of a span adequate to accommodate therein ham shanks of substantially different diameters and is disposed with its center so elevated above the supporting surface of the base member as to freely accommodate the ham shank therein while the main body portion of the ham rests upon the base member in front of said frame member, and a contractible member disposed within the confines of and substantially coplanar with said frame member forming a dimensionally adjustable loop in substantial registry with the opening in said frame member, said frame member extending over said loop, means for mounting said loop in bodily shiftable relation to and in the plane of the frame member to enable said loop constructively to engage the ham shank while the ham body is supported upon the base member, and means operative to draw said loop tightly against said ham shank to constrict and close the vascular tract thereof.

2. In an apparatus as defined in claim 1 wherein said contractible member is formed of an inherently non-extensible but flexible element arranged with one end thereof fixedly anchored relatively to said structure and its opposite end freely disposed for movement relatively to said structure.

3. In an apparatus as defined in claim 1 wherein said loop tightening means includes an operator located adjacent the front of said base member.

4. In apparatus for applying a tourniquet to the neck or shank portion of a ham or the like, a flexible member arranged in the form of a loop with its opposite end portions disposed on the same side of the loop and extending tangentially from the latter respectively in opposite directions, and yieldable means engaged with said loop and operative to open the same, said yieldable means including a plurality of coil springs circumferentially spaced about said loop and extending radially therefrom, the inner ends of said springs being slidably connected to said loop and the outer ends of said springs being fixedly anchored, one end of said flexible member being fixedly anchored and the other being free to be drawn substantially tangentially of the loop to close the same against the force exerted by said yieldable means to hold the loop open.

5. In apparatus for applying a tourniquet to the neck of a ham or the like, a rigid annular frame, a flexible member arranged in the form of a loop approximately centered within said annular frame, the opposite end portions of said flexible member being on the same side of said loop and extended tangentially from the latter respectively in opposite directions, and a plurality of radially extending coil springs circumferentially spaced about said loop and annular frame and positioned therebetween, the inner ends of said coil springs being slidably connected to said loop and the outer ends of said coil springs being anchored to said annular frame whereby said loop is yieldably secured in a predetermined position, one of said end portions of the flexible member being anchored to one side of said annular frame and the other of said end portions being free to be drawn through the diametrically opposite side of said annular frame for closing said loop against the force exerted by said coil springs for opening said loop.

6. In apparatus for applying a tourniquet to the neck of a ham or the like as defined in claim 5 wherein the annular frame includes axially spaced means disposed respectively on opposite sides of the several coil springs for restricting lateral movement of their inner ends.

7. In an apparatus for constricting the shank portion of a ham or the like preparatory to injecting the same with curing liquid, a base member having a horizontally disposed upper surface for supporting the ham in position for injection of the curing liquid, an upstanding frame member fixedly mounted upon said base member at one end thereof, said frame member having a central opening so disposed freely above said upper surface of the base member and in a plane normal to said surface as to freely accommodate therein the shank portion of the ham while the main portion thereof rests upon said base member in front of said frame member, and a flexible member arranged in the form of a loop having a bight portion substantially coplanar with and located within the central opening of said frame member, and a plurality of coil springs circumferentially spaced about the bight portion of said loop and extending radially outwardly thereof, the inner and outer ends of said springs being connected respectively to the bight portion of said loop and to said fixedly mounted frame whereby to permit planar positional adjustment of said loop relatively to said frame within the central opening thereof, for constrictive engagement with the ham shank.

8. In an apparatus for constricting the shank portion of a ham or the like preparatory to injecting the same with curing liquid, a base member having a horizontally disposed upper surface for supporting the ham in position for injection of the curing liquid, an upstanding frame member fixedly mounted upon said base member at one end thereof, said frame member having a central opening so disposed freely above said upper surface of the base member and in a plane normal to said surface as to freely accommodate therein the shank portion of the ham while the main portion thereof rests upon said base member, a flexible member arranged in the form of a loop having a bight portion substantially coplanar with and located within the central opening of said frame member, and a plurality of coil springs circumferentially spaced about the bight portion of said loop and extending radially outwardly thereof, the inner and outer ends of said springs being connected respectively to the bight portion of said loop and to said fixedly mounted frame whereby to permit planar positional adjustment of said loop relatively to said frame within the central opening thereof for constrictive engagement with the ham shank, and means operative to draw said loop tightly against said ham shank to constrict and substantially close the vascular tract thereof.

9. A method of treating hams comprising the steps of looping an inherently non-extensible flexible member about the body of a ham shank exteriorly thereof, drawing said member tightly about the shank of the ham to compress a portion of the shank body and substantially to close the vascular tract of the ham against the passage of liquid at the thus compressed portion, and injecting a curing liquid into said vascular tract adjacent the end of said ham opposite from said shank, whereby the passage of said liquid out the shank end of said vascular tract is substantially prevented while said member is drawn tightly about said shank.

References Cited in the file of this patent

UNITED STATES PATENTS

| 80,665 | Reddy | Aug. 4, 1869 |
| 1,199,052 | Crawford | Sept. 26, 1916 |
| 1,709,046 | Throgmorton | Apr. 16, 1929 |
| 1,951,436 | Paddock | Mar. 20, 1934 |
| 1,994,459 | Beisser | Mar. 19, 1935 |
| 2,088,257 | Beisser | July 27, 1937 |
| 2,234,686 | Walter | Mar. 11, 1941 |
| 2,560,060 | Zwosta | July 10, 1951 |
| 2,666,339 | Schwarz | Jan. 19, 1954 |

FOREIGN PATENTS

| 488,811 | France | July 26, 1918 |
| 324,524 | Germany | Aug. 31, 1920 |

U. S. DEPARTMENT OF COMMERCE
PATENT OFFICE
CERTIFICATE OF CORRECTION

Patent No. 2,827,380            March 18, 1958

Morris Trachtman et al.

It is hereby certified that error appears in the printed specification of the above numbered patent requiring correction and that the said Letters Patent should read as corrected below.

Column 5, line 14, for "constructively" read --constrictively--.

Signed and sealed this 20th day of May 1958.

(SEAL)
Attest:
KARL H. AXLINE

Attesting Officer

ROBERT C. WATSON
Commissioner of Patents